July 16, 1940.  F. H. JONES  2,208,076
BUMPER
Filed Sept. 18, 1939
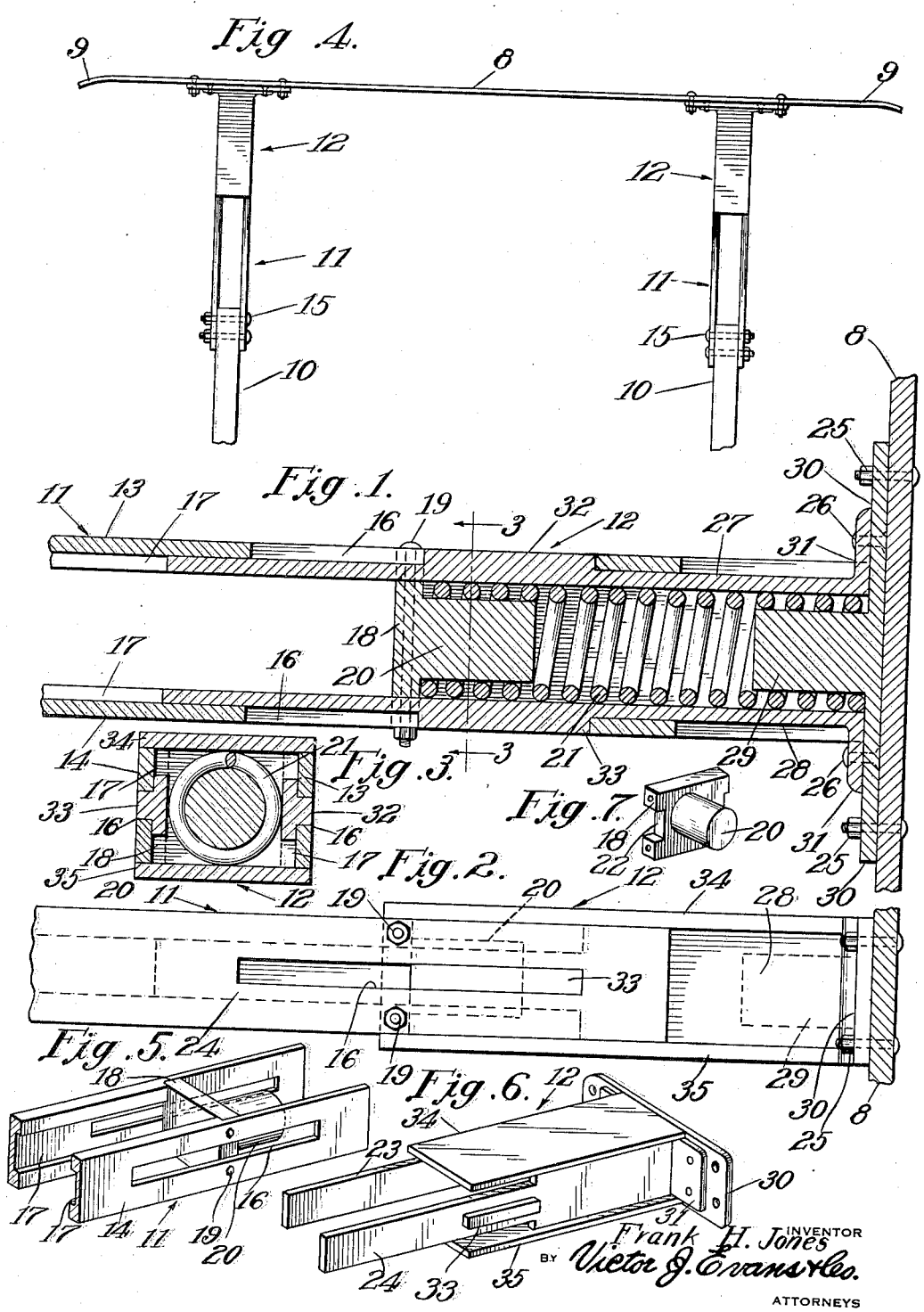
Frank H. Jones INVENTOR
BY Victor J. Evans & Co.
ATTORNEYS Patented July 16, 1940

2,208,076

UNITED STATES PATENT OFFICE 2,208,076

BUMPER

Frank H. Jones, Houston, Tex.

Application September 18, 1939, Serial No. 295,499

4 Claims. (Cl. 293—55)

The present invention relates to new and useful improvements in bumpers for vehicles, and more particularly in the bumpers which are designed for use on automobiles and the like.

The primary object of the invention is to provide a vehicle bumper and resilient mounting means through the medium of which transmission of shock to the vehicle will be substantially eliminated or materially reduced.

Another object of the invention resides in the provision of a vehicle bumper that is so designed as to absorb the initial shock or impact of a collision and thereby mitigate to some extent the seriousness of damages to persons or property involved in the accident.

A further object of the invention is to provide a vehicle bumper comprising a member that is fixedly secured to the frame of the vehicle and adapted to telescopically receive a second member secured to the bumper with a compression spring interposed between the two members forming an efficient and effective shock absorber.

The invention will be fully and comprehensively understood from a consideration of the following detailed description when read in connection with the accompanying drawing which forms a part of the application.

In the drawing:

Figure 1 is a longitudinal sectional view of a shock absorbing bumper embodying the features of the present invention.

Figure 2 is a side elevational view thereof.

Figure 3 is a vertical sectional view taken substantially on line 3—3 of Figure 1.

Figure 4 is a top plan view of the bumper mounted on a vehicle.

Figure 5 is a detail perspective view of one of the members of the bumper unit.

Figure 6 is a detail perspective view of the other member of the bumper unit, and Figure 7 is a perspective view of a supporting member for the compression spring.

Referring to the drawing in detail, it will be seen that the embodiment of the present invention which has been illustrated comprises a bar 8 of suitable metal having rearwardly curved portions 9, the same representing a conventional bumper bar. The present invention is primarily designed for attaching the bar 8 to the chassis 10 of a vehicle, not shown. The means for attaching the bumper bar 8 comprises a fixed member and a movable member generally designated by the reference numerals 11 and 12, respectively. As conventionally provided, the bumper bar 8 is to be attached adjacent each end to the vehicle and it is to be understood that the following description applies to the type of unit to be attached to each end portion of the bumper.

The fixed member 11 comprises girder extensions 13 and 14 attached by means 15 in spaced parallel relation to the chassis 10. If desired, however, said extensions may form integral parts of the chassis projecting forwardly therefrom. The forward part of the members 13 and 14 is provided with horizontally disposed slots 16 while said extensions are provided in their rearward portions with channel-shaped guides 17. Referring more particularly to Figure 5 of the drawing, it will be noted that the forward portion of the girder extension is reduced in thickness as compared with the rearward portion, in which latter portion are formed the guides 17. A combined base and holder 18 is located and supported between the girder extensions and secured thereto by bolts or similar means 19. A stud 20 projects forwardly from the base 18 forming one means for supporting the compression coil spring 21 within the movable member 12. The base and holder is particularly illustrated in Figure 7 of the drawing and it will be noted that the side portions thereof are notched as indicated at 22 for slidably receiving the reduced end portions 23 and 24 of the movable member 12 which move within the guides 17.

The movable member 12 is directly attached to the bumper bar 8 by being bolted or otherwise secured thereto as indicated at 25 and 26, and comprises spaced parallel members 27 and 28 supporting therebetween the compression coil spring 21 one end thereof encircling the stud 20 and the other end encircling a similar stud 29 extending from the plate 30. The plate 30 is bolted or otherwise secured by the means 25 to the bumper 8 and the ear portions 31 of the members 27 and 28 are bolted to the face of the plate 30 by the means 26. As afore indicated the ends 23 and 24 of the members 27 and 28, respectively, are reduced and are adapted to slidably engage the guides 17. Key portions 32 and 33 are formed on the members 27 and 28 fitting in the slot 16 of the girder extensions being movable within said slots upon impact of the bumper bar. Top and bottom cover plates 34 and 35, respectively, are secured by any desired means to the members 27 and 28 completely enclosing the spring 21.

It will be readily understood that upon impact of the bumper bar with an object that the member 12 will be forced rearwardly against the tension of the spring 21 with the key portions 32 and 33 moving within the slots 16 and the reduced ends 23 and 24 moving within the guides 17 thereby absorbing the initial shock or impact of the collision and mitigating to some extent the seriousness of damages to persons or property involved in the accident. The tension of the spring 21, after the impact, will return the bumper bar 8 and the member 12 to normal position.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawing nor to the precise construction described and, therefore, such changes and modifications may be made therein as do not affect the spirit of the invention nor exceed the scope thereof as expressed in the appended claims.

What is claimed is:

1. A vehicle bumper comprising a bar, and means for mounting said bar on the vehicle, said means including a first and second member disposed in telescoping relation, said first member being fixedly secured to the vehicle and comprising a pair of arms supported in spaced parallel relation, one end of said arms being formed with slots and the other end of said arms being formed with grooves for receiving said second member, and tension means supported between said members.

2. A vehicle bumper comprising a bar, and means for mounting said bar on the vehicle, said means including a first and second member disposed in telescoping relation, said first member being fixedly secured to the vehicle and comprising a pair of arms supported in spaced parallel relation, one end of said arms being formed with slots and the other end of said arms being formed with grooves for receiving said second member, said second member being secured to said bumper, key portions on said second member fitting within said slots, and tension means supported between said members.

3. A vehicle bumper comprising a bar, and means for mounting said bar on the vehicle, said means including a first and second member disposed in telescoping relation, said first member being fixedly secured to the vehicle and comprising a pair of arms supported in spaced parallel relation, one end of said arms being formed with slots and the other end of said arms being formed with grooves for receiving said second member, said second member being secured to said bumper and comprising a pair of spaced parallel arms, one end of said arms being reduced for engagement with said grooves, key portions formed on said arms fitting within said slots, and tension means supported between said members.

4. A vehicle bumper comprising a bar, and means for mounting said bar on the vehicle, said means including a first and second member disposed in telescoping relation, said first member being fixedly secured to the vehicle and comprising a pair of arms supported in spaced parallel relation, one end of said arms being formed with slots and the other end of said arms being formed with grooves for receiving said second member, said second member being secured to said bumper and comprising a pair of spaced parallel arms, one end of said arms being reduced for engagement with said grooves, key portions formed on said arms fitting within said slots, a base and holder supported between the spaced arms of said first member, a stud integral with and projecting forwardly from said base, a second stud secured to said bumper and projecting inwardly between the spaced arms of said second member, and a compression coil spring supported by said studs within said second member.

FRANK H. JONES.